US012313283B2

(12) United States Patent
Titchkosky et al.

(10) Patent No.: US 12,313,283 B2
(45) Date of Patent: May 27, 2025

(54) AIR-DIFFUSION SYSTEM MANUFACTURED VIA ADDITIVE MANUFACTURING

(71) Applicant: BVN Architecture Pty Ltd, Sydney (AU)

(72) Inventors: Ninotschka Anna Titchkosky, Double Bay (AU); Tim Schork, Coogee (AU); Christopher James Bickerton, Darlinghurst (AU); Michael John Bennett, Cremorne (AU); Mitchell Robert Page, Avalon (AU); David Anthony Pigram, Redfern (AU); Tran Tuan Anh Dang, Lidcombe (AU)

(73) Assignee: BVN ARCHITECTURE PTY LTD, Sydney (AU)

( * ) Notice: Subject to any disclaimer, the term of this patent is extended or adjusted under 35 U.S.C. 154(b) by 382 days.

(21) Appl. No.: 17/741,144

(22) Filed: May 10, 2022

(65) Prior Publication Data
US 2022/0404062 A1    Dec. 22, 2022

(30) Foreign Application Priority Data
Jun. 18, 2021  (AU) .................. 2021204072

(51) Int. Cl.
| | | |
|---|---|---|
| *F24F 13/02* | (2006.01) | |
| *B29C 64/209* | (2017.01) | |
| *B33Y 30/00* | (2015.01) | |
| *B33Y 80/00* | (2015.01) | |
| *F24F 13/06* | (2006.01) | |

(52) U.S. Cl.
CPC ........ *F24F 13/0245* (2013.01); *B29C 64/209* (2017.08); *B33Y 30/00* (2014.12); *B33Y 80/00* (2014.12); *F24F 13/06* (2013.01); *F24F 2013/0608* (2013.01)

(58) Field of Classification Search
CPC ................ F24F 13/0245; F24F 13/06; F24F 2013/0608; B33Y 30/00; B33Y 80/00; B29C 64/209
See application file for complete search history.

(56) References Cited

U.S. PATENT DOCUMENTS

| | | | | |
|---|---|---|---|---|
| 2015/0108677 | A1* | 4/2015 | Mark ............... | B33Y 70/10 |
| | | | | 425/375 |
| 2018/0356118 | A1* | 12/2018 | van Tooren ............. | B32B 1/08 |
| 2021/0229366 | A1* | 7/2021 | Barbolini ............. | B29C 64/393 |
| 2021/0256184 | A1* | 8/2021 | Nabi ..................... | G06F 30/17 |

FOREIGN PATENT DOCUMENTS

| | | | | | |
|---|---|---|---|---|---|
| CN | 104943531 | A | * | 9/2015 | |
| EP | 0899519 | A1 | * | 3/1999 | |
| KR | 20160056472 | A | * | 5/2016 | |
| SE | 519431 | C2 | * | 2/2003 | ........... F16L 3/00 |
| WO | WO-9514891 | A1 | * | 6/1995 | ........... F24F 13/02 |

* cited by examiner

*Primary Examiner* — Edelmira Bosques
*Assistant Examiner* — Michael James Giordano
(74) *Attorney, Agent, or Firm* — Neal, Gerber & Eisenberg, LLP (57) ABSTRACT

The present disclosure relates to an air-diffusion system, a computer-implemented method of designing an air-diffusion system, an apparatus for additive manufacturing an air-diffusion system, and a method of additive manufacturing an air-diffusion system.

11 Claims, 9 Drawing Sheets

Figure 10

AIR-DIFFUSION SYSTEM MANUFACTURED VIA ADDITIVE MANUFACTURING

PRIORITY CLAIM

This application claims priority to and the benefit of Australian Patent Application No. 2021204072, filed on Jun. 18, 2021, the entire contents of which is incorporated by reference herein.

TECHNICAL FIELD

The present disclosure relates to an air-diffusion system, a computer-implemented method of designing an air-diffusion system, an apparatus for additive manufacturing an air-diffusion system, and a method of additive manufacturing an air-diffusion system.

In particular, but not exclusively, the air-diffuser system includes ducts for conveying air in an environment, which include an integrated diffuser for diffusing air into the environment, and connectors for connecting the ducts, wherein the ducts and the connectors are unitarily manufactured using additive manufacturing.

BACKGROUND

Many office environments are retrofits within existing building stock, especially as new workplace organizational models require new and different office layouts. Within conventional multistory office buildings, services may contribute on average 33% to the embodied carbon footprint of the overall building, with air-conditioning/air-diffusion systems constituting 25%. The ductwork represents the majority of the embodied carbon footprint at 60%. Existing ductwork generally cannot be adapted to new office layout requirements and is often demolished, contributing to an increase in construction waste. Further, tenancy agreements are increasingly short-term leases, which result in frequent changes of the fit out to cater for the requirements of the new tenants.

There is a need to recalibrate the environmental impact of the built environment, particularly ductwork of air-diffusion systems, and to drive meaningful action towards decarbonization and sustainable fabrication of air-diffusion systems.

There is also a clear trend towards excluding suspended ceilings in new office fit outs to gain embodied energy savings and increased room height. The resulting exposure of the existing ductwork, however, is often unsightly which significantly dampens the move towards suspended ceiling-free offices.

Existing ductwork for air-diffusion systems is most commonly made from thin sheet metal and ducts are folded into linear rectangular profiles with standard bifurcating connector elements. The maximum width of stock material (coil) has resulted in the adoption of a standardised 1400 mm length for straight sections of ductwork. Curved, tapered, or bespoke components remain time and labor intensive due to general fabrication constraints and the accompanying demand for manual processing. The relative cost of non-standard rigid ducts pushes designers to minimize their quantity by distorting overall configurations to favor standard straight elements and by using flexible or semi-flexible ductwork in their place. Both approaches decrease the efficiency of air movement.

Moreover, industrial folding processes—even for simple rectangular cross sections— frequently feature joint components that leak air, adding to the inefficiency of the resulting thermal system of the ductwork. The implementation of non-differentiated, symmetrical cross sections—due to fabrication constraints—results in relatively highly inefficient airflow across the system. Other limitations extend to a potential fabrication response to variable cross sections of elements; optimization of duct geometries for airflow, material distribution or structural requirements; or element specification for connecting parts.

In addition, metal is a relatively poor thermal insulator and the temperature differential between the un-serviced air space above the ceiling and the air within the ductwork can lead to condensation and energy loss via conduction. As a result, metal ductwork within cavities often requires an insulating wrapping, often called "lagging". In exposed ceiling air-diffusion scenarios, there are limited alternative solutions to rigid metal ductwork with lagging. Common alternatives include flexi-duct systems, which is relatively high vulnerability and relatively cost intensive to install, and fabric ducts, which have limited structural performance. While the reduction of cost, environmental impacts, relative simplification of installation, and thermal performance play a significant role in adopting these alternatives, the significant drawbacks of these alternatives have led to none of them replacing sheet-metal ductwork or significantly reducing the prevalence of suspended ceiling systems, and nor do these alternatives deliver adequate aesthetic benefits.

The above discussion of background art is included to explain the context of the present disclosure. It is not to be taken as an admission that any of the documents or other material referred to was published, known or part of the common general knowledge at the priority date of any one of the claims of this specification.

SUMMARY

According to one aspect of the present disclosure, there is provided an air-diffusion system including: ducts for conveying air in an environment, wherein one or more of the ducts include a diffuser for diffusing air into the environment; and connectors for connecting the ducts, wherein the ducts are unitarily manufactured using additive manufacturing.

The manufacture or fabrication of air-diffusion systems using additive manufacturing (e.g., 3D printing) techniques, according to embodiments of the present disclosure, enables the design and fabrication of an air-diffusion system that is relatively efficient, customisable and visually appealing. This air-diffusion system has significantly reduced embodied carbon in the ductwork. The ducts and the connectors are also, in certain embodiments, manufactured using recycled materials, such as recyclable PET and PET-G, to further improve the sustainability of fabrication of the air-diffusion system. Also, the materials may include color dye additives to improve aesthetic benefits.

In certain embodiments, the diffuser is unitarily manufactured using additive manufacturing and integrated with a corresponding one or more of the ducts. Further, the diffuser has a size and porosity configured to diffuse air into the environment at a designated airflow. For example, the environment is an office floor within a multi-story office building.

In certain embodiments, the porosity of the diffuser is manufactured by altering the additive manufacturing of the corresponding one or more of the ducts. The additive manufacturing of the ducts is performed by an apparatus having an extruder configured to extrude a material at an designated extrusion rate, and altering the additive manufacturing of the corresponding one or more of the ducts includes one or more of: altering path of the extruder; altering path velocity of the extruder; altering cooling of the extruded material; altering temperature of the extruded material; and altering the designated extrusion rate of the extruded material.

For example, the porosity of the diffuser is provided by the diffuser having a plurality of spaced apart pores having designated spacing and geometry.

In addition, the ducts may have cross-sections configured to convey air to be diffused at the designated airflow. Further, the ducts may have cross-sections configured to convey air in the ducts at one or more of: a designated air pressure, a designated velocity, and a designated temperature range.

The ducts may have symmetric or asymmetric cross-sections. For example, asymmetric cross-sections of the ducts may have a continuous tapering to maintain the designated air pressure and velocity of air in the ducts.

In an embodiment, the connectors are also unitarily manufactured using additive manufacturing. The connectors may have cross-sections configured to provide a smooth transition of air between the connectors and the connected ducts. The connectors may also have cross-sections configured to connect to two or more ducts, and the two or more ducts may have different cross-sections configured to convey different volumes of air. That is, the connectors are, in certain embodiments, bifurcating nodes in the air-diffusion system.

According to another aspect of the present disclosure, there is provided a computer-implemented method of designing an air-diffusion system for an environment as mentioned above. The method includes: inputting parameters including desired airflow characteristics of the ducts; simulating designs of geometries of the ducts, the diffusers, and the connectors of the air-diffusion system using the parameters; and determining an optimized design of geometry of the ducts, the diffusers, and the connectors of the air-diffuser system from the simulated designs.

In an embodiment, the parameters further include on or more of: color of the ducts; cross-sectional shape of the ducts; layout characteristics of the ducts and the connectors in the air-diffusion system; physical characteristics of the environment and or use characteristics of the environment; manufacturing limitations of the ducts, the diffusers, and the connectors of the air-diffusion system; and previous optimized designs of geometries of the ducts, the diffusers, and the connectors of the air-diffusion system.

According to another aspect of the present disclosure, there is provided an apparatus for additive manufacturing an air-diffusion system for an environment as mentioned above. The apparatus includes: an extruder configured to extrude a material at a designated extrusion rate to unitarily manufacture the ducts.

In an embodiment, the extruder is configured to extrude the material to unitarily manufacture the diffuser with a corresponding one or more of the ducts, and the diffuser has a size and porosity configured to diffuse air into the environment at a designated airflow.

In certain embodiments, the porosity of the diffuser is manufactured by altering the additive manufacturing of the corresponding one or more of the ducts using the apparatus. Altering the additive manufacturing of the corresponding one or more of the ducts includes one or more of: altering path of the extruder; altering path velocity of the extruder; altering temperature of the extruded material; and altering the designated extrusion rate of the extruded material.

In an embodiment, the apparatus further includes a cooling system configured to cool the extruded material, and wherein altering the additive manufacturing of the corresponding one or more of the ducts further includes altering cooling of the extruded material using the cooling system.

According to another aspect of the present disclosure, there is provided a method of additive manufacturing an air-diffusion system for an environment as mentioned above. The method includes extruding a material at a designated extrusion rate to unitarily manufacture the ducts.

As mentioned above in the background, standard geometries of existing ductwork and air-diffusion systems have to date been limited by the sheet metal that is generally employed. This results in relatively primitive, low-resolution geometries that are not ideal for airflow, have relatively inefficient air diffusion, create environments with relatively low thermal comfort and are of relatively poor aesthetic quality. The present disclosure ameliorates at least these issues.

For example, the method of designing and manufacturing an air-diffusion system employs computational design techniques and large-scale additive manufacturing (3D printing) techniques to provide an air-diffusion system with an optimized design of geometry of the ducts, the diffusers, and the connectors.

Further, detailed computational Fluid Dynamics (CFD) studies into air velocity through the ducts and the connectors could also be used to inform the respective geometries of the ducts and the connectors (e.g., the connector is shaped as a bifurcation node), and the overall topology of the air-diffusion system, so as to optimise the air-diffusion system for airflow and climatic comfort in an open plan workplace environment.

Accordingly, the 3D printing of the ducts and the connectors of the air-diffusion system enables the fabrication of: (a) aerodynamic and asymmetric cross sections with a continuous tapering geometry that proves a desired air pressure and velocity; (b) geometries for integrated and locally differentiated perforations that respond to inside constrained zones and outside localized thermal environment; (c) a connection strategy for smooth transitions between duct profiles that change in dimensioning relative to airflow; and (d) the integration of color and gradients and/or alternative printable materials.

That is, the above method of designing and manufacturing an air-diffusion system enables the manufacture or fabrication of relatively topologically complex and relatively highly intricate geometries, without the need of additionally printed support structure. The quality and thickness of 3D extruded components of the resultant air-diffusion system could be successfully controlled to produce relatively lightweight, robust ducts and connectors with variable custom cross sections, air-tight joints, integrated features for suspension and aerodynamic bifurcation of module sections. Moreover, the shift from a thermally conductive metal, to a material that may be a thermally insulating plastic—which has exponential growth for recycled streams—has additional environmental benefits as it may reduce the need for thermal lagging, and therefore further reduces the material and embodied carbon footprint of the system.

BRIEF DESCRIPTION OF DRAWINGS

Embodiments of the present disclosure will now be described, by way of example only, with reference to the accompanying drawings, in which.

DETAILED DESCRIPTION

Figure 1:
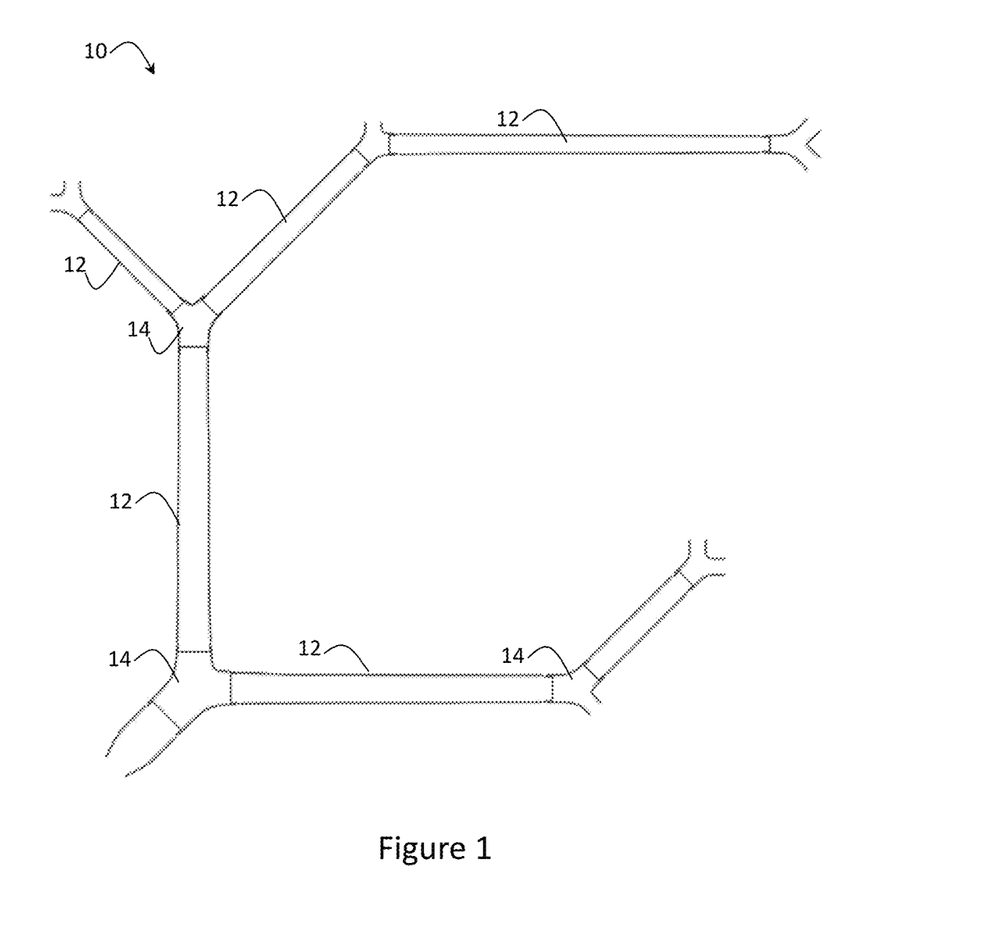
FIG. 1 is an air-diffusion system according to an embodiment of the present disclosure.
Figure 2:
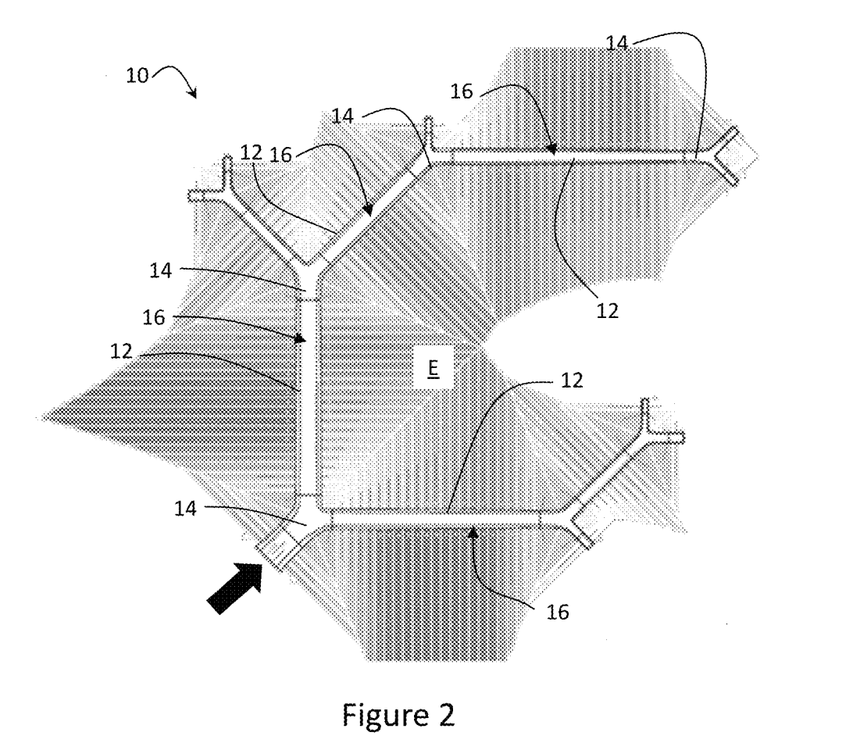
FIG. 2 is an embodiment of an air-diffusion system in an environment showing airflow in the environment according an embodiment of the present disclosure.
Figure 3:
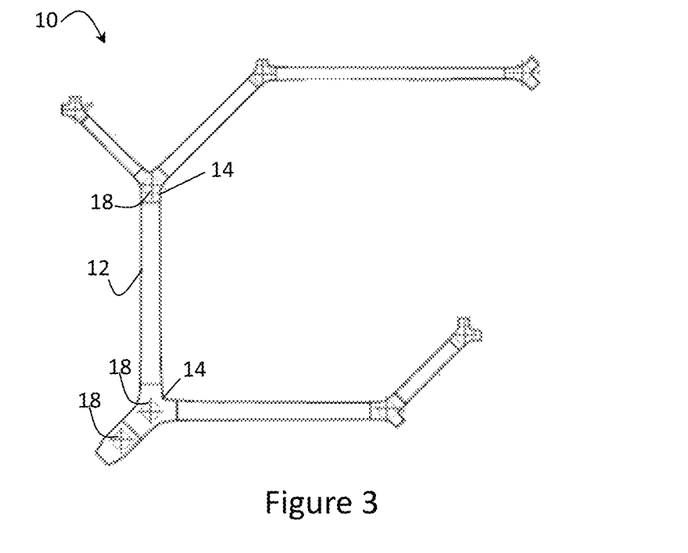
FIG. 3 is an air-diffusion system showing ceiling mount locations according to an embodiment of the present disclosure.

An embodiment of an air-diffusion system 10 is shown in FIGS. 1 to 3. The air-diffusion system 10, shown in each of these embodiments, includes ducts 12 configured to convey air in an environment E, which is shown in FIG. 2, and connectors 14 configured to connect the ducts 12. As mentioned above, the environment E may be an office floor of a multi-story building. One or more of the ducts 12 further include a diffuser 16 configured to diffuse air into the environment E. The airflow in the embodiment is shown as the shaded areas of FIG. 2. FIG. 2 also shows air entering the air-diffusion system 10, as indicated by the arrow, into a first one of the connectors 14 which bifurcates the airflow into two ducts 12, which both include diffusers 16 along their length to diffuse air into the environment E. Each of these two ducts 12 further has a connector 14 at their opposed ends which then bifurcates the airflow into two more ducts 12.

As above, the ducts 12 and the connectors 14 are unitarily manufactured using additive manufacturing (e.g., 3D printing). The diffuser 16 is also unitarily manufactured using additive manufacturing and is integrated with a corresponding one of the ducts 12. In some configurations of the air-diffusion system 10, some of the ducts 12 may not have an integrated diffuser 16 as no airflow is required to be diffused into that particular part of the environment. In use, the air-diffusion system 10 is mounted to an underside of generally an exposed ceiling in the environment using ceiling mounts 18 that are disposed on some or all of the connectors 14, as shown in FIG. 3, or on the ducts 12.

Figure 5:
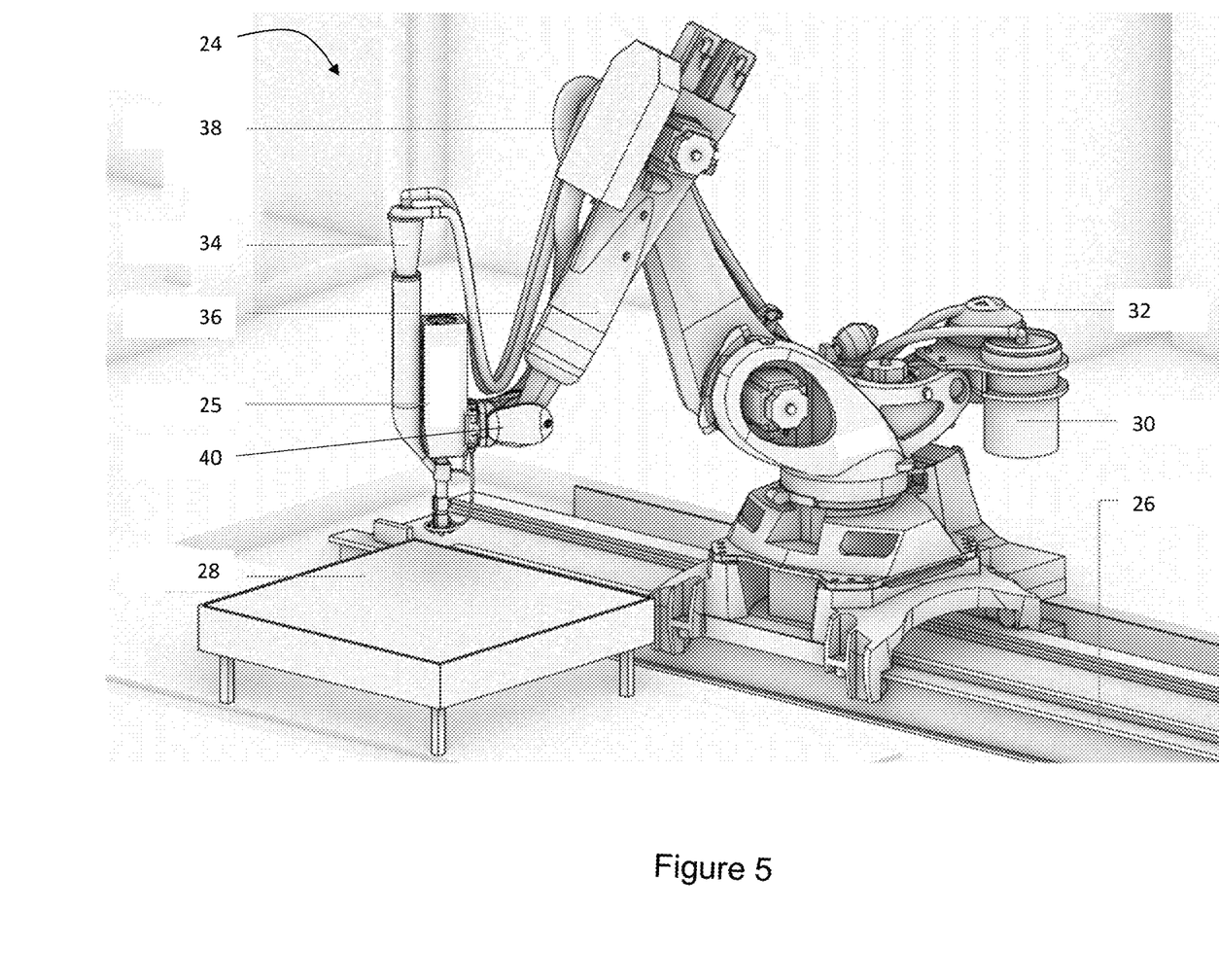
FIG. 5 is an apparatus for additive manufacturing an air-diffusion system according to an embodiment of the present disclosure.
Figure 6:
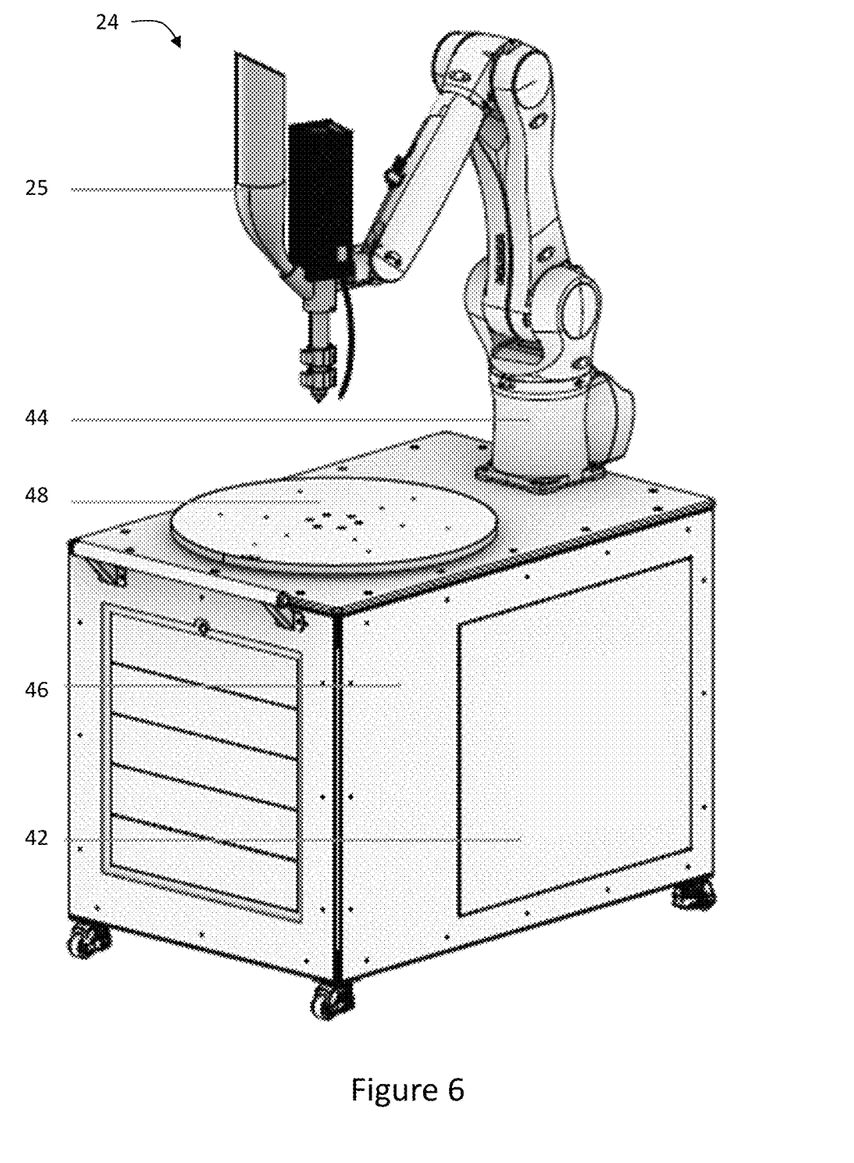
FIG. 6 is an apparatus for additive manufacturing an air-diffusion system according to an embodiment of the present disclosure.

Embodiments of an apparatus 24 for additive manufacturing an air-diffusion system 10 for an environment E are shown in FIGS. 5 and 6, where the apparatus 24 includes an extruder 25 configured to extrude a material at a designated extrusion rate to unitarily manufacture the ducts 12 and the connectors 14. The extruder 25 is shown in more detail in the embodiments of FIGS. 7 and 8 and is configured to extrude a material at a designated extrusion rate. As mentioned above, the material may be a recyclable material, such as recycled PET or PET-G.

Figure 4:
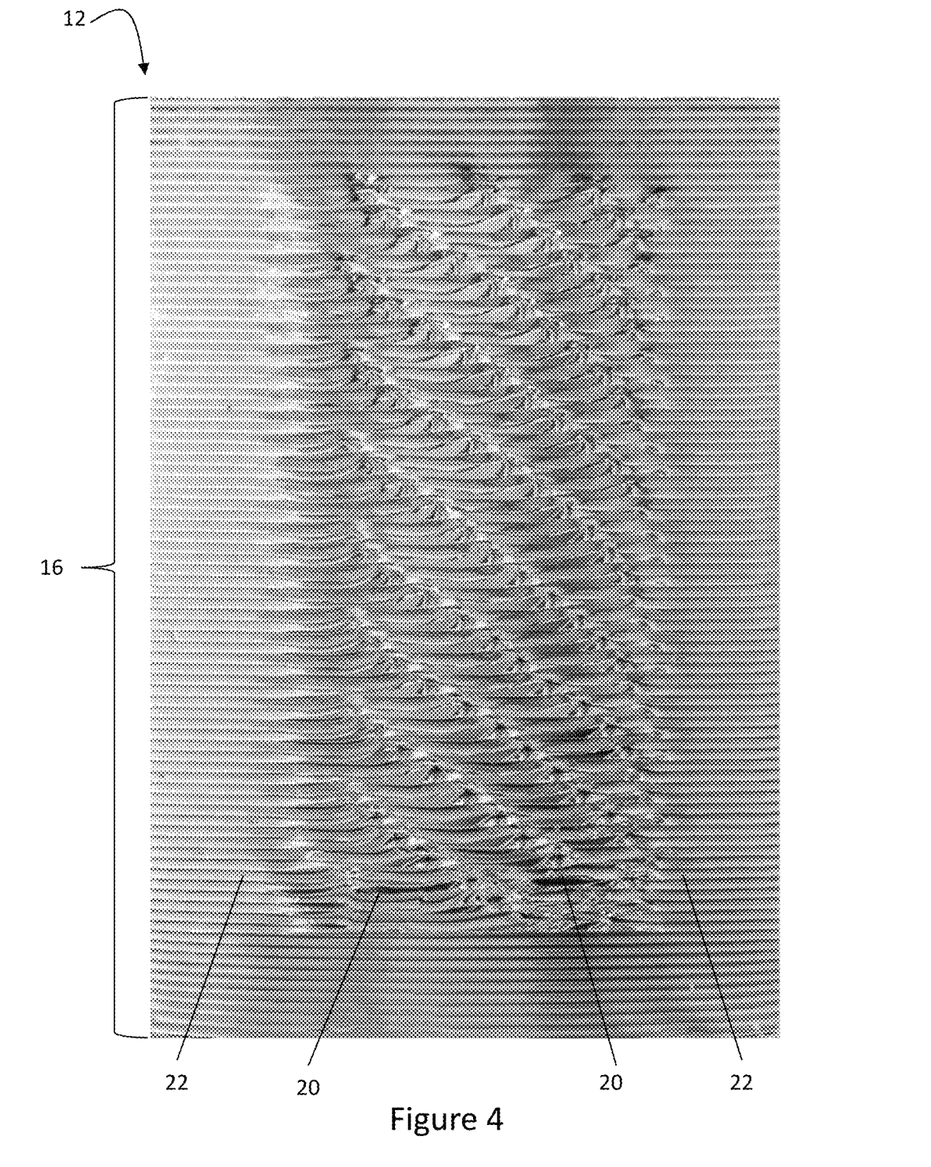
FIG. 4 is a duct of an air-diffusion system according to an embodiment of the present disclosure.

A diffuser 16, integrated with a duct 12, is shown in more detail in FIG. 4. The diffuser 16 has a size and porosity configured to diffuse air into the environment at a designated flow rate. That is, the porosity of the diffuser 16 is provided by a plurality of spaced apart pores 20 having a designated spacing and geometry within the 3D printed wall 22 of the 3D printed duct 12. That is, the pores 20 extend along a designated length of the duct 12 and are located at designated locations on the duct 12, to diffuse air into the desired part of the environment adjacent the pores 20.

The porosity of the diffuser 16 is manufactured by altering the additive manufacturing of the corresponding ducts 12. As shown in FIG. 4, the 3D printed wall 22 of the duct 12 is altered by the apparatus 24 to produce the pores 20. The altering of the additive manufacturing process of the ducts 12 includes one or more of: altering path of the extruder 25; altering path velocity of the extruder 25; altering cooling of the extruded material; altering temperature of the extruded material; and altering the designated extrusion rate of the extruded material.

That is, the geometries of the 3D-printed ducts 12 are designed to integrate diffusion. This enables multiple performative qualities, providing aesthetic differentiation, textural variance, and crucially, the main diffusion strategy for the delivery of supplied air. As opposed to traditional ducting systems, the diffuser 16 is not a separate part, but instead is integrated in the overall system geometry. The flexibility of 3D printing enables the duct 12 to be relatively geometrically finely tuned, which in itself is a passive performative element as it enables the air-diffusion system 10 to self-balance the pressure levels.

Figure 10:
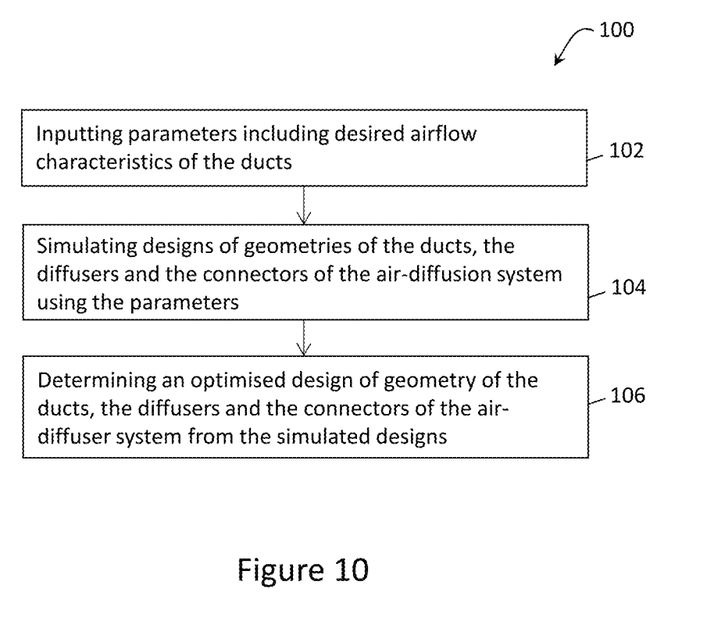
FIG. 10 is a flow chart of a method of designing an air-diffusion system according to an embodiment of the present disclosure.

Significantly, the calibrated geometries enables for specified diffusion in respective zones. Multiple strategies to achieve effective diffusion range from relatively low-resolution textural variances, to relatively high-resolution porosity precisely deployed by the developed multi-optimization strategy. Different micro-diffusion geometries of the pores is shown in FIG. 10, which are created by gestures encoded into the toolpath and extruder 25 robot trajectory. Jumps, velocity shifts, pauses, non-planar gestures, varied extrusion rates, and changes in extrusion cooling offer and achieve a broad range of controllable diffusion moments, which are described below in more detail.

The apparatus 24 thus enables a computer-implemented method of designing an optimized air-diffusion system 10 for an environment. This method takes into consideration desired airflow characteristics of the ducts 12 in the environment, as well as the possible geometries of the ducts 12, the diffusers 16, and the connectors 14 of the air-diffusion system 10 that can be achieved with additive manufacturing. The method simulates the designs to determine an optimized system 10 design.

The ducts 12 shown in FIG. 1 have different cross-sections that are configured to convey air to be diffused at a designated air pressure, a designated air velocity, and or a designated air temperature range. These different cross-sections are asymmetric and have a continuous tapering profile so as to provide a desired air pressure and velocity of air in the ducts 12.

The connectors 14 are bi-furcating nodes that have cross-sections configured to provide a smooth transition of air between the connectors 14 and two connected ducts 12. In respect of some of the connectors 14, the two connected ducts 12 may have different cross-sections as they are configured to convey different volumes of air to the diffusers 14. The connectors 14 of these different diameter ducts 12 have a profile that is configured to connect these ducts 12 whilst providing a smooth transition for the air travelling into the ducts 12.

The connectors 14 have profiles, such as a standard socket and spigot joint, that are seamlessly integrated in the 3D printing process. This is achieved through a printing method using the apparatus 24 that incrementally reduces the print layer height and robot velocity in conjunction with offsetting the robot trajectory. The combination of these results in relatively thinner and relatively wider print layers that create the required corbel for an air-tight connection between the connectors 14 and the ducts 12.

The geometry of the pores 20 in the diffuser 16 of the ducts 12 provides for continuously dynamic airstreams to be diffused into the environment. The morphological and structural design of the example of an optimized air-diffusion system 10 of FIG. 1 considers conflicting variables, such as structural displacement and utilisation, material usage, wall thickness, cross-sectional attributes, and Gaussian curvature, to determine an optimized design.

The optimized topology of an air-diffusion system shown in FIG. 1 is the result of a series of algorithmic procedures that were developed to take into account the existing on-site work and climatic zones of an open plan workplace, and to compute an ideal distributed topology (spatial layout) of the overall air-diffusion system. On a meso-level, this resulting topology is used as the input for a subsequent algorithmic procedure that accurately dimensions and sizes each duct's effective cross section and required porosity at predefined intervals, to maintain the required air-supply and air-diffusion. The result is a continuously tapered and spatially differentiated bifurcating network of ducts 12 with consistent air pressure that enables for a relatively flexible and adaptable use of the office environment.

In respect of a non-limiting example, the apparatus 24 is configured to fully leverage the functional capacities of recycled plastic. The apparatus 24 includes integrated hardware and software sub-systems that enable a deep control of the material deposition at multiple levels of resolution. The generation of tool paths and robotic trajectory planning are achieved by computational procedures and data workflows. To achieve the desired print quality, a series of bespoke and material specific end effectors were developed and built. The apparatus 24 is therefore able to achieve variable and reliable extrusion with the recycled plastic (e.g., PET-G (Polyethylene terephthalate, glycol modified)) with a control system that enables a relative precise calibration of temperature, motor and gearbox.

The example of an apparatus 24 of FIG. 5 includes a number of components controlled by a controller (not shown in FIG. 5) to manufacture the ducts 12 and the connector 14 of the air-diffusion system 10. FIG. 5 shows the apparatus 24 in the form of a 3D printing robot mounted on a rail 26 such that the robot is movable along the rail 26. The apparatus 24 includes an extruder 25 configured to extrude material at a designated extrusion rate to manufacture the ducts 12 and the connectors 14 on a heat bed 28.

The material to be extruded is stored in a material hopper 30 that is vacuum fed, via a vacuum system 32, to an extruder material hopper 34. The extruder 25 is located on a 6-axis robot arm 36 that is connected to the extruder 25 with a power, data and air-routing cable 38, and a two-axis joint 40.

In respect of another non-limiting example, the apparatus 24 of FIG. 6 is intended for smaller applications than the apparatus 24 of FIG. 5. Such an apparatus is also mobile. The apparatus 24 of FIG. 6 also includes a number of computers that are controlled by a controller 42. The extruder 25 is disposed on a 6-axis robot arm 44 and is mounted to a mobile robot cart 46 for mobility. The robot cart 46 could therefore be located anywhere, such as within the environment to 3D print components of the air-diffusion system 10 within the environment. The extruder 25 here is configured to extrude material at a designated extrusion rate to manufacture the ducts 12 and the connectors 14 on a rotational table 48 that is mounted to the mobile robot cart 46.

Figure 7:
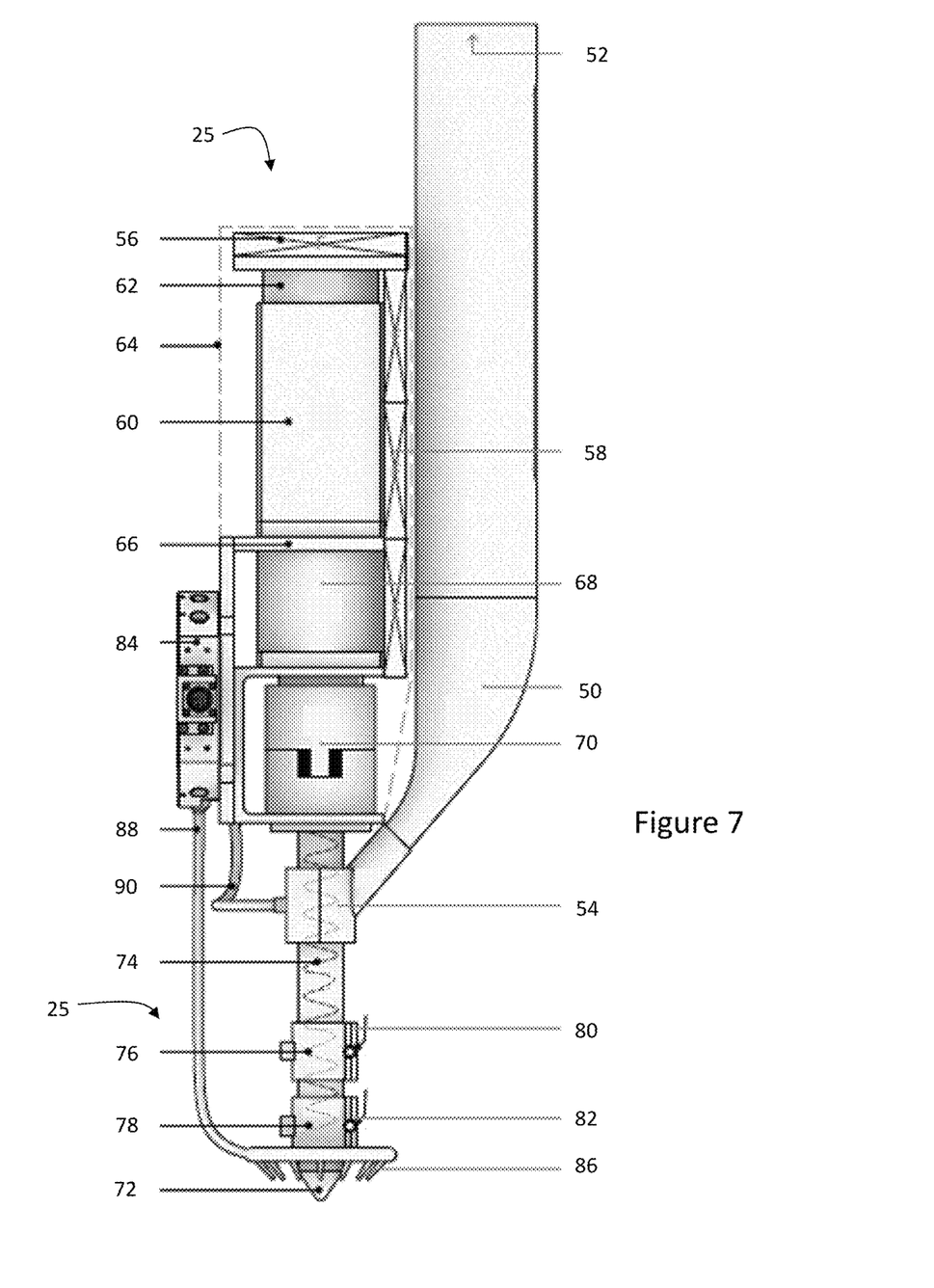
FIG. 7 is an extruder of an apparatus for additive manufacturing an air-diffusion system according to an embodiment of the present disclosure.

FIG. 7 shows the extruder 25 in more detail. The extruder 25 includes a material hopper 50 connected to a material feed system 52, which may be a continuous vacuum fed material delivery system as described. The material is fed from the hopper 50 into the extruder 25 via a hopper feed 54.

The extruder 25 includes fans 56 58 configured to keep a stepper motor 60 that is configured to move the extruder 25 cool. The motor 60 has a motor encoder 62 and is protected by a cover 64. The motor 60 is attached to a frame 66 and a planetary gearbox 68 so that movement of the extruder 25 can be controlled. The gearbox 68 is also mounted to a flex coupler 70 that is mounted to the frame 66. At the distal end of the extruder 25 is a nozzle 72 configured to emit the extruded material to form the ducts 12 and the connectors 14 as described above. The nozzle 72 has a profile configured to enhance or optimise extrusion rates and profiles.

The material moves through a barrel 74, including an internal auger, to a first heating zone 76 and a second heating zone 78 of the extruder 25. The first heating zone 76 is heated by a first band heating element 80 configured to heat the material to a temperature range of 150-180 degrees C. The second heating zone 78 is heated by a second band heating element configured to heat the material to a temperature range of 215-240 degrees C., and a thermocouple 82 is located at the second heating zone 78 to monitor temperature of the material in this zone. The two heating elements for the two heating zones 76 78 are positioned near the nozzle 72 and are adjustable along the barrel 74. The heating elements are controlled by two PID controllers that offer control of pre-melt and flow rates of the material inside the extruder barrel 74.

The auger of the barrel 74 is tapered and is driven by the stepper motor 60. Further, the flex coupler 70 and gearbox 68 are also driven by the stepper motor 60, which is controllable either by a remote motor motion controller via pulse width modulation frequency, or via a programmable logic controller (PLC) system.

Relative efficiency and reliability of print speed with plastics also relies on relatively rapid cooling to avoid excessive heat and print slump. This is achieved via a programmed activation of an air solenoid 84 that directs compressed air to an array of cooling jets 86 surrounding the 3D print nozzle 72 path via a first compressed air link 88. As mentioned, material is fed into the gravity fed hopper 54 via a remote vacuum feed system that can be activated remotely to facility continuous printing. To minimize rising heat creep in the material in the hopper 54, the air solenoid 84 can also direct compressed air via a second compressed air link 90 to the hopper 54.

Working with plastics affords the added benefit of mixing in additives to customise the material properties. Such additives can alter friction and slip coefficients, material hardness and clarity, static build-up reduction, fire retardance and color of the printed ducts 12 and connectors 14.

The color additives may provide improved aesthetic characteristics of the air-diffusion system 10 for ceilings in office environments.

Figure 8:
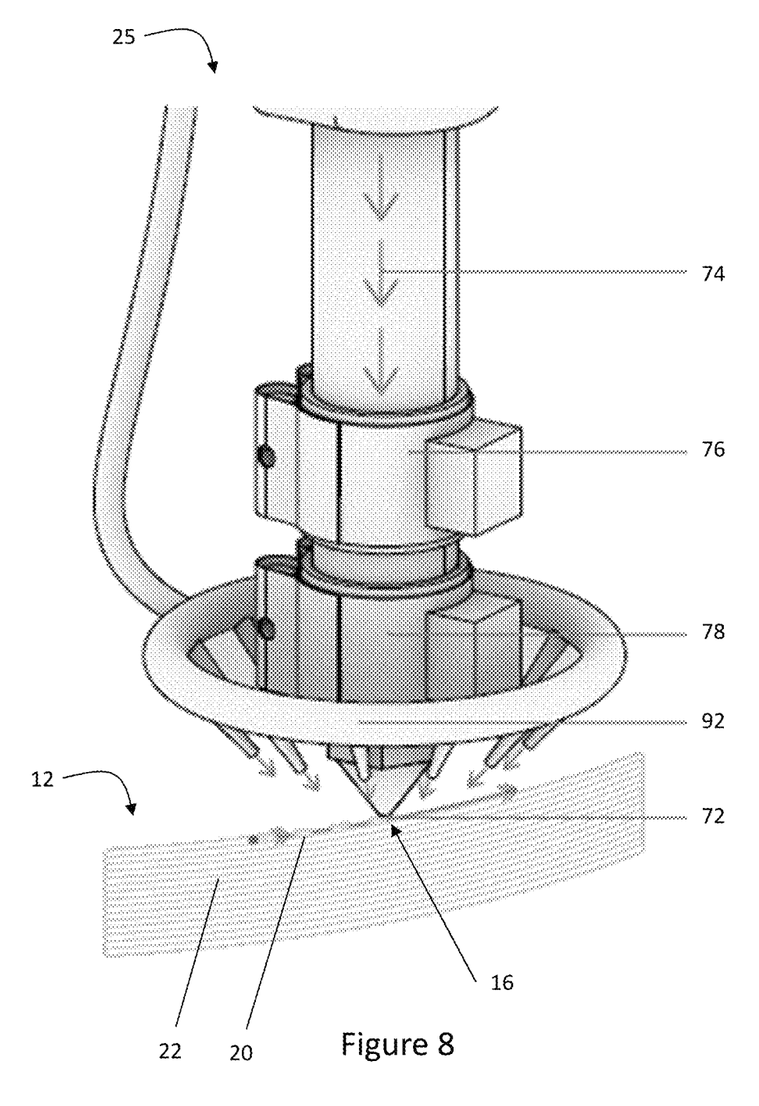
FIG. 8 is an example of an extruder in use altering manufacturing of a duct according to an embodiment of the present disclosure.

FIG. 8 shows the nozzle 72 of the extruder 25 in more detail in use manufacturing a diffuser 16 integrated within a duct 12. Material passes through the barrel 74 into the first 76 and second 78 heating zones which is then dispensed by the nozzle 72. That is, the extruder 25 is configured to extrude the material at a designated extrusion rate to form the wall 22 of the duct 12. The manufacturing of the wall 22 of the duct 12 is then altered to manufacture the pores 20 of the diffuser 16. In this embodiment, the path velocity of the nozzle 72 of the extruder 25 is altered by being sped up to produce the pores 20 in the wall 22 of the duct 12 forming the diffuser 16. In addition, the extruder 25 also includes a cooling system that directs compressed air to an array of cooling jets that are spaced about a cooling ring 92 to cool the extruded material to prevent excess heat and print slump.

Figure 9:
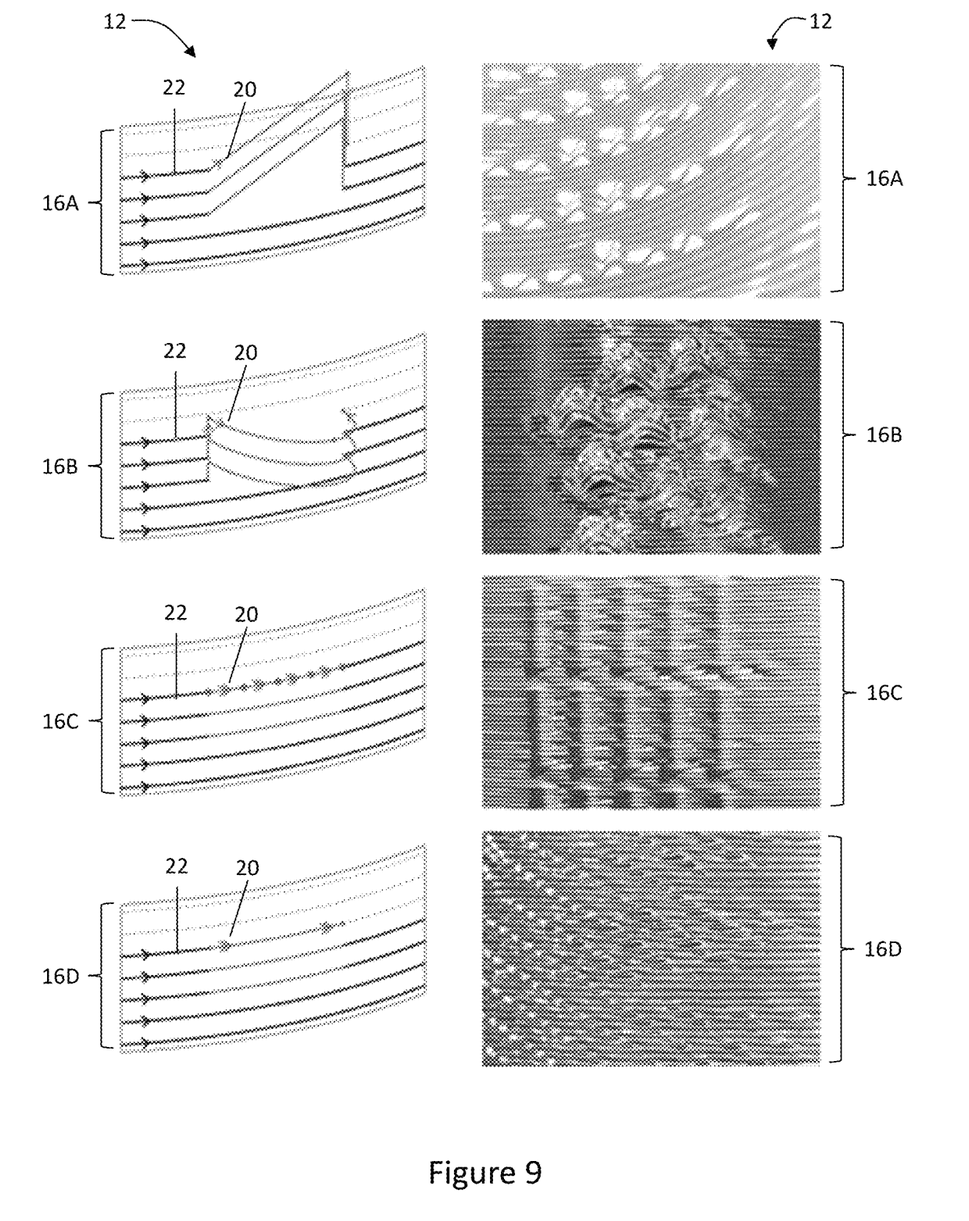
FIG. 9 shows diffusers of ducts of an air-diffusion system and examples of altering manufacturing of the ducts according to embodiments of the present disclosure.

FIG. 9 shows different methods of altering the additive manufacturing the duct 12 to manufacture a diffuser 16A 16B 16C 16D with different configurations of spaced apart pores 20. The pores 20 have a different designated spacing and geometry to diffuse air at different designated airflows. In respect of the diffuser 16A, the nozzle 72 of the extruder 25 is configured to jump while producing the wall 22 to produce the pore 20. In respect of the diffuser 16A, the nozzle 72 of the extruder 25 is configured to pause while producing the wall 22 to produce the pore 20. In respect of the diffuser 16C, the nozzle 72 of the extruder 25 is configured to be moved out of plane while producing the wall 22 to produce the pore 20. In respect of the diffuser 16D, the nozzle 72 of the extruder 25 is configured to be sped up while producing the wall 22 to produce the pore 20.

A flow chart summarising a computer-implemented method 100 of designing an air diffuser system for an environment, such as an office floor, according to the embodiments described above is shown in FIG. 10. The method includes the steps of: inputting 102 parameters including desired airflow characteristics of the ducts; simulating 104 designs of geometries of the ducts, the diffusers, and the connectors of the air-diffusion system using the parameters; and determining 106 an optimized design of geometry of the ducts, the diffusers, and the connectors of the air-diffuser system from the simulated designs.

Those skilled in the art will also appreciate that the disclosure described herein is susceptible to variations and modifications other than those specifically described. It is to be understood that the disclosure includes all such variations and modifications. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. An air-diffusion system comprising:
a plurality of ducts that convey air in an environment, wherein:
the ducts are unitarily manufactured using additive manufacturing,
at least one of the ducts includes an integrated diffuser having a porosity configured to diffuse air into the environment at a designated airflow,
the porosity of the diffuser is provided by the diffuser defining a plurality of pores, spaced apart at predefined intervals based on the designated airflow, within a wall of the at least one of the ducts,
a plurality of asymmetric cross-sections defined by the diffuser form a continuous tapering to maintain a designated air pressure and a designated velocity of the designated airflow in the at least one of the ducts, and
the porosity of the diffuser is manufactured by altering, relative to a portion of the at least one of the ducts spaced apart from the diffuser, the additive manufacturing of the at least one of the ducts; and
a plurality of connectors unitarily manufactured using additive manufacturing, wherein at least one of the connectors connects at least two of the ducts.

2. The air-diffusion system of claim 1, wherein the diffuser has a size configured to diffuse air into the environment at the designated airflow.

3. The air-diffusion system of claim 1, wherein the additive manufacturing is performed by an apparatus having an extruder configured to extrude a material at a designated extrusion rate, and altering the additive manufacturing of the corresponding at least one of the ducts includes at least one of: altering a path of the extruder, altering a path velocity of the extruder; altering a cooling of the extruded material; altering a temperature of the extruded material; and altering the designated extrusion rate of the extruded material.

4. The air-diffusion system of claim 1, wherein the plurality of pores within the wall have designated spacing and geometry.

5. The air-diffusion system of claim 1, wherein the connectors define cross-sections configured to provide a smooth transition of air between the connectors and the connected ducts.

6. The air-diffusion system of claim 5, wherein the connectors define cross-sections configured to connect to at least two of the ducts.

7. The air-diffusion system of claim 6, wherein the at least two of the ducts define different cross-sections configured to convey different volumes of air.

8. A computer-implemented method of designing an air-diffusion system for an environment, the computer-implemented method comprising:
inputting parameters including a desired airflow characteristic of a plurality of additive manufactured ducts of the air-diffusion system, wherein at least one of the plurality of additive manufactured ducts includes an integrated diffuser having a porosity configured to diffuse air into an environment at a designated airflow, a plurality of asymmetric cross-sections defined by the diffuser being continuously tapered to maintain a designated air pressure and a designated velocity of the designated airflow, the porosity of the diffuser is provided by the diffuser defining a plurality of pores, spaced apart at predefined intervals based on the designated airflow, within a wall of the at least one of the additive manufactured ducts;
automatically simulating, using the inputted parameters and based on at least one additive manufacturing limitation of the ducts, the diffuser, and a plurality of connectors of the air-diffusion system, designs of geometries of the plurality of ducts, the diffusers, and the connectors; and
determining an optimized design of geometry of the ducts, the diffusers, and the connectors from the simulated designs of geometries.

9. The computer-implemented method of claim 8, wherein the parameters further include at least one of: a color of the ducts; a cross-sectional shape of the ducts; at least one layout characteristic of the ducts and the connectors; at least one physical characteristic of the environment; and any previous optimized designs of geometries of the ducts, the diffusers, and the connectors.

10. The computer-implemented method of claim 8, wherein the automatic simulation is based on at least one of a structural displacement variable, a utilization variable, an additive manufacturing material usage variable, a wall thickness variable, a cross-sectional attribute variable, and a Gaussian curvature variable.

11. The computer-implemented method of claim 8, wherein the porosity of the diffuser is based on altering, relative to a portion of the at least one of the additive manufactured ducts spaced apart from the diffuser, the additive manufacturing of that duct.

* * * * *